Jan. 27, 1970

D. SCARAMUCCI 3,491,796

COMBINED STOP AND CHECK VALVE

Filed June 3, 1966

INVENTOR.
DOMER SCARAMUCCI
BY
Dunlap and Laney
ATTORNEYS

Jan. 27, 1970   D. SCARAMUCCI   3,491,796
COMBINED STOP AND CHECK VALVE
Filed June 3, 1966   3 Sheets-Sheet 2

INVENTOR.
DOMER SCARAMUCCI
BY
Dunlap and Laney
ATTORNEYS

INVENTOR.
DOMER SCARAMUCCI

United States Patent Office 3,491,796
Patented Jan. 27, 1970

3,491,796
COMBINED STOP AND CHECK VALVE
Domer Scaramucci, 3245 S. Hattie Ave.,
Oklahoma City, Okla. 73129
Filed June 3, 1966, Ser. No. 555,105
Int. Cl. F16k 15/18, 15/03, 5/06
U.S. Cl. 137—614.2                      11 Claims

ABSTRACT OF THE DISCLOSURE

A valve having both a stop valve member to prevent flow in either direction when closed, and a check valve member to prevent flow in only one direction, wherein both valve members cooperate with a common seat/seal assembly and wherein the check valve member does not restrict the flow through the stop valve member when the stop valve member is open and flow is in one direction through the valve.

---

This invention relates generally to improvements in fluid flow control valves. More particularly, but not by way of limitation, this invention relates to an improved valve combining the features of a stop valve and a check valve in a unitary configuration.

Many applications of fluid valves require the use of a stop valve and check valve in series in a fluid circuit. The usual method utilized in the past for obtaining the functional features of both types of valves has been to simply install a stop valve and a separate check valve in the circuit. Manifestly, an arrangement utilizing two separate valves is very large and cumbersome. Also, providing two separate valves is expensive in that the cost of the two complete valves must be borne as well as the cost of the means utilized to connect the valves and the labor performed in connecting the valves.

Some previously constructed combined valves have included a stop valve member that contains the check valve member, that is, the check valve member is located within the stop valve member and functions to permit fluid flow therethrough in only one direction. If such valves are constructed in a size comparable to either a single stop or check valve, the structure required to place the check valve member in the stop valve member considerably reduces the flow area through the valve.

Structural arrangements of this type have not proved to be entirely satisfactory primarily due to the required reduction in flow area through the valve or due to the size of the valve if an equal flow area is provided. Also, the manufacturing involved in such complex structures is generally extremely complicated and time consuming and, therefore, very expensive.

This invention generally provides an improved combined stop and check valve comprising: valve body means having a bore extending therethrough and having upstream and downstream ends; annular seat/seal means in the body means encircling a portion of the bore; a stop valve member disposed in the bore between the seat/seal means and the upstream end of the valve body means, the stop valve member being movable between a position wherein the bore is open and a position wherein the bore is closed, the stop valve member sealingly engaging the seat/seal means when in the closed position; and, a check valve member disposed in the bore between the seat/seal means and the downstream end of the body means, the check valve body member being movable in the bore only from the seat/seal means in response to fluid flow through the bore from the upstream end to the downstream end of the valve body means, the check valve member being into sealing engagement with the seat/seal means to prevent fluid flow through the bore in the opposite direction.

One object of the invention is to provide an improved combined stop and check valve that is effective to perform the independent functions of a stop and check valve.

Another object of the invention is to provide an improved combined stop and check valve that functions as a unitary structure for installation in a fluid circuit.

A further object of the invention is to provide an improved combined stop and check valve that is relatively small as compared to separate stop and check valves.

Still another object of the invention is to provide an improved combined stop and check valve that can be quickly and easily manufactured.

One further object of the invention is to provide an improved stop and check valve that can be quickly and easily installed in a fluid circuit.

The foregoing and additional objects and advantages of the invention will become more apparent as the following detailed description is read in conjunction with the accompanying drawings wherein like reference characters denote like parts in all views and wherein.

Figure 1:
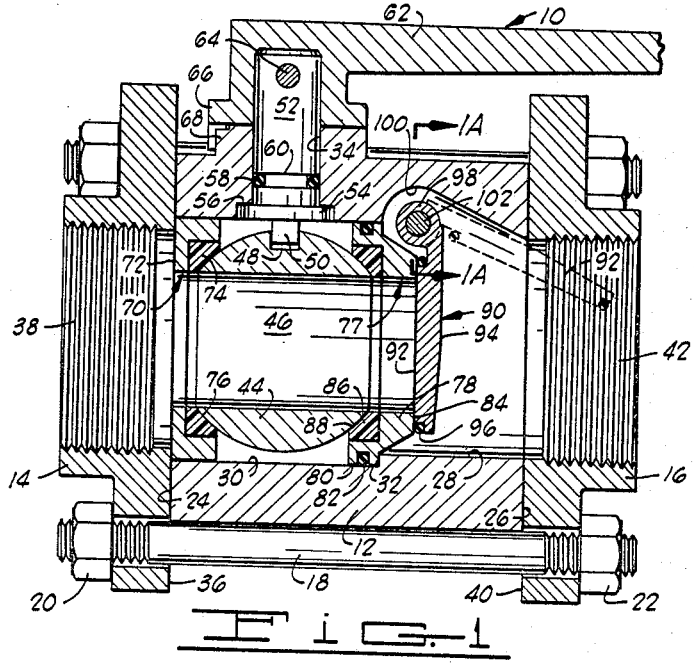
FIG. 1 is a vertical cross-sectional view of a combined stop and check valve constructed in accordance with the invention.

Embodiment of FIG. 1

Referring to the drawing and to FIG. 1 in particular shown therein and generally designated by the reference character 10 is a combined stop and check valve constructed in accordance with the invention. As shown therein, the valve 10 includes a valve body 12 disposed between an upstream flanged connection member 14 and a downstream flanged connection member 16.

The flanged connection members 14 and 16 and the valve body 12 are held assembled by a plurality of threaded fasteners 18 that extend through the flanged connection members 14 and 16. A threaded nut 20 threaded on each of the fasteners 18 engages the upstream flanged connection member 14 and a threaded nut 22 is disposed in threaded engagement with each of the fasteners 18 and in engagement with the downstream flanged connection member 16.

The valve body 12 includes an upstream end face 24, a downstream end face 26, and a bore 28 extending therethrough intersecting the end faces 24 and 26. An enlarged counterbore 30 in the valve body 12 adjacent the upstream end face 24 thereon forms a shoulder 32 in the valve body 12. An opening 34 extends transversely through the valve body 12 intersecting the counterbore 30 for reasons that will appear more fully hereinafter.

The upstream flanged connection member 14 includes an end face 36 that is in engagement with the upstream end face 24 on the valve body 12 and a partially threaded opening 38 that extends therethrough intersecting the end face 36. The opening 38 is disposed in axial alignment with the bore 28 in the valve body 12 when the flanged connection member 14 is assembled therewith.

Similarly, the downstream flanged connection member 16 includes an end face 40 that is in engagement with the downstream end face 26 on the valve body 12 and a partially threaded opening 42 extending therethrough. The opening 42 is also disposed in axial alignment with the bore 28 in the valve body 12 when the downstream connection member 16 is assembled therewith.

A stop valve member 44, which is illustrated as being spherical in configuration, is disposed in the counterbore 30 in the valve body 12. The stop valve member 44 includes a flow port 46 extending therethrough that is arranged to be axially aligned with the bore 28 when in the open position as illustrated in FIG. 1. The valve member 44 also includes a rectangular recess 48 on the exterior surface thereof that is sized to receive a rectangular lower end 50 on a valve operating member 52.

The valve operating member 52 extends through the opening 34 in the valve body 12 and includes an exterior flange 54. The flange 54 is in engagement with a downwardly facing surface 56 formed in the valve body 12 adjacent the counterbore 30.

An O-ring seal 58 is disposed in an annular recess 60 formed in the valve operating member 52. The O-ring seal 58 sealingly engages the valve operating member 52 and the valve body 12 in the opening 34 to prevent the escape of fluid therebetween.

The upper or exposed end of the valve operating member 52 is connected with a valve handle 62 by a pin 64. The handle 62 includes a lug 66 that is arranged to engage spaced abutments 68 (only one is shown in FIG. 1) to limit the rotation of the valve handle 62 and the interconnected valve member 44 to approximately 90°, that is, to rotation between open and closed positions.

An annular seat/seal assembly 70 is disposed in the valve body 12 adjacent the upstream end face 24 thereof. The seat/seal assembly 70 includes a relatively rigid annular member 72 disposed in the counterbore 30 in engagement with the end face 36 on the upstream flanged connection member 14 and a relatively resilient annular seal member 74 carried by the annular member 72. The seal member 74 includes a surface 76 that is arranged to sealingly engage the exterior surface of the valve member 44.

A downstream seat/seal assembly 77 is disposed in the valve body 12 between the valve member 44 and the downstream end face 26 thereon. As clearly illustrated in FIG. 1, the seat/seal assembly 77 includes a relatively rigid annular member 78 having an outer periphery 80 disposed in the counterbore 30. An O-ring seal 82 is disposed in the annular member 78 adjacent the outer periphery 80 in sealing engagement with the valve body 12 in the counterbore 30.

It will be noted in FIG. 1 that the seat/seal assembly 77 is restrained from moving relatively toward the downstream end face 26 of the valve body 12 by engagement with the shoulder 32 in the valve body 12. The annular member 78 also includes a seating surface 84 that encircles a portion of the bore 28 generally facing the downstream end of the valve 10 for purposes that will be described fore fully hereinafter.

A relatively resilient annular seal member 86 is carried by the annular member 78 and includes a surface 88 thereon that is arranged to sealingly engage the exterior surface of the valve member 44. It should be pointed out that the spacing between the annular seal members 74 and 86 is such that the valve member 44 is retained in substantially the position illustrated in FIG. 1 and so that initial sealing engagement occurs between the surfaces 76 and 88 and the exterior surface of the valve member 44.

Figure 1A:
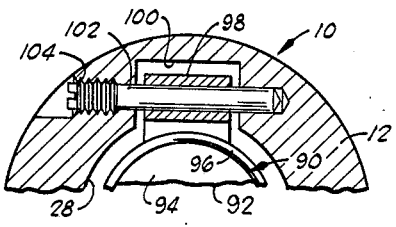
FIG. 1A is a fragmentary cross-sectional view taken substantially along the line 1A—1A of FIG. 1.

A check valve assembly, generally indicated by the reference character 90, is also disposed in the valve body 12. As shown in FIGS. 1 and 1A, the check valve assembly 90 includes a check valve member 92 comprising a disc-like portion 94 that is sized to engage the seating surface 84 on the seat/seal assembly 77, an O-ring seal 96 encircling the disc-like portion 94 arranged to sealingly engage the seating surface 84, a lug portion 98 that projects from the periphery of the disc-like portion 94 into a recess 100 formed in the valve body 12, and a hinge pin 102 pivotally supporting the check valve member 92 in the valve body 12. As illustrated more clearly in FIG. 1A, the hinge pin 102 is partially threaded as shown at 104 for threadedly engaging the valve body 12 to retain the pin 102 and the check valve member 92 therein.

Operation of the embodiment of FIG. 1

With the valve 10 connected in a fluid circuit (not shown), fluid flows through the opening 38 in the upstream flanged connection member 14 through the flow port 46 in the valve member 44, pivoting the check valve member 92 into the position illustrated in dash lines in FIG. 1, that is, into the open position wherein the fluid flows from the valve 10 through the opening 42 in the downstream flanged connection member 16. If the fluid should attempt to flow in the opposite direction, that is, through the valve 10 from the opening 42 in the downstream connection member 16 to the opening 38 in the upstream flanged connection member 14, the check valve member 92 returns into engagement with the seating surface 84 on the seat/seal assembly 77. Manifestly, when the O-ring seal 96 carried by the check valve member 92 is in sealing engagement with the surface 84, no fluid can flow through the valve 10 in the reverse direction.

If it is desired to use the valve 10 as a stop valve, the valve handle 62 is rotated approximately 90°, rotating the valve member 44 into a closed position (not shown), that is, into a position wherein the flow port 46 extending therethrough is disposed at approximately 90° with respect to the bore 28 in the valve body 12. When the valve member 44 is in this position, it can be appreciated that the valve 10 is tightly closed against fluid flow due to the sealing engagement between the annular seal members 74 and/or 86 and the exterior surface of the valve member 44.

Thus, it can be appreciated from the foregoing that the valve 10 provides both the functions of a stop valve and a check valve or the function of either type valve. Such functions are provided in a compact, unitary valve that requires considerably less space than two separate valves and that may be manufactured more quickly and less expensively. Also, the valve 10, with the check valve member 92 in the open position, provides for the full flow of fluid therethrough in contrast to the previously proposed combination check and stop valves wherein the check valve member is mounted within the stop valve member.

Figure 2:
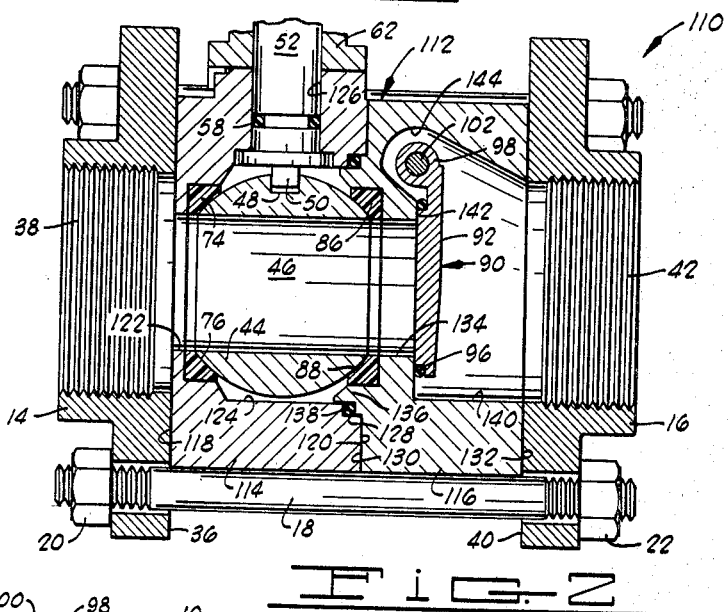
FIG. 2 is a vertical cross-sectional view of another embodiment of combined stop and check valve also constructed in accordance with the invention.

Embodiment of FIG. 2

The vertical cross-sectional view of FIG. 2 illustrates another embodiment of combined stop and check valve generally designated by the reference character 110 and also constructed in accordance with the invention. Many components of the valve 110 are identical to those previously described in connection with FIG. 1 and will be designated by the same reference characters.

As clearly illustrated in FIG. 2, the valve 110 includes a valve body 112 comprising a stop valve body member 114 and a check valve body member 116. The valve body 112 is disposed between the upstream flanged connection member 14 and a downstream flanged connection member 16. The flanged connection members 14 and 16 are held in assembled relationship with the valve body 112 by a plurality of threaded fasteners 18 and nuts 20 and 22 disposed thereon in engagement with the upstream and downstream connection members 14 and 16, respectively.

The stop valve body member 114 includes an end face 118 disposed in engagement with the end face 36 on the upstream flanged connection member 14, an end face 120, and a bore 122 extending therethrough intersecting the end faces 118 and 120 and disposed in axial alignment with the opening 38 extending through the upstream flanged connection member 14. A first counterbore 124 extends into the stop valve body member 114 from the end face 120 and is sized to receive the stop valve member 44. An opening 126 extends transversely through the stop valve body member 114 intersecting the counterbore 124 and is sized to receive the valve operating member 52. A second counterbore 128 is formed in the stop valve body member 114 adjacent the end face 120 for purposes that will appear more fully hereinafter.

The annular seal member 74 is disposed in the stop valve body member 114 encircling a portion of the bore 122 therein. The annular seal member 74 includes the surface 76 which is arranged to sealingly engage the exterior surface of the valve member 44.

The check valve body member 116 includes an upstream end face 130 that is disposed in engagement with the end face 120 on the stop valve body member 114, a downstream end face 132 that is in engagement with the end face 40 on the downsteam flanged connection member 16, and a bore 134 that extends through the check valve body member 116 intersecting the end faces 130 and 132 thereon and in axial alignment with the bore 122 in the stop valve body member 114.

An axial flange portion 136 projects from the upstream end face 130 on the check valve body member 116 into the counterbores 124 and 128 in the stop valve body member 114. An O-ring seal 138 is disposed in the counterbore 128 in the stop valve body member 114 in sealing engagement with the stop valve body member and with the check valve body member 116.

A counterbore 140 extends into the check valve body member 116 from the downstream end face 132 thereon forming an annular seating surface 142 surrounding a portion of the bore 134 and generally facing the downstream end of the valve 110.

The annular seal member 86 is carried by the check valve body 116 and encircles a portion of the bore 134. The annular seal member 86 is arranged so that the surface 88 thereon sealingly engages the stop valve member 44. The arrangement and spacing of the seal members 74 and 86 is such that the seal members 74 and 86 engage the exterior surface of the stop valve member 44 to initiate sealing engagement therewith.

The check valve assembly 90 is pivotally mounted in the check valve body member 116 as previously described in connection with the mounting of the check valve assembly 90 in the valve body 12. The check valve body member 116 is provided with a recess 144 in the upper interior side thereof for receiving the lug portion 98 of the check valve member 92. The pivot pin 102 extends through the check valve body member 116 and through the lug portion 98 of the check valve member 92 as previously described in connection with FIG. 1A.

Operationally, the valve 114 functions precisely as previously described in connection with the valve 10. The primary distinction lies in the structure of the valve body 112 as compared to the valve body 12. That is, the check valve body member 116 carries structure comparable to the seat/seal assembly 76 as illustrated in FIG. 1. However, it will be noted that the annular seal member 86 in the valve 110 is carried by the check valve body member 116 and cooperates with the stop valve body member 114 to provide a seat/seal for the stop valve member 44 and provides the seating surface 142 for cooperation with the check valve member 92.

Figure 3:
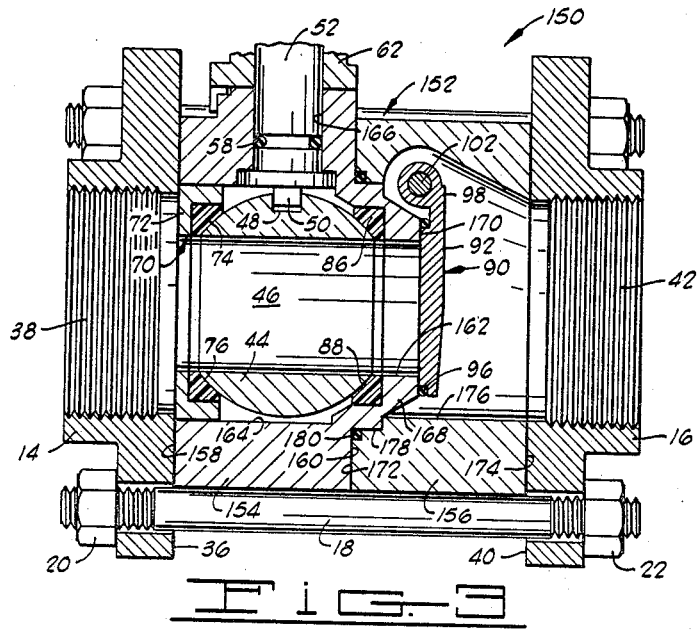
FIG. 3 is a vertical cross-sectional view of still another embodiment of combined stop and check valve also constructed in accordance with the invention.

Embodiment of FIG. 3

FIG. 3 illustrates still another embodiment of combined stop and check valve that is generally designated by the reference character 150 and that is also constructed in accordance with the invention. Various components of the valve 150 as illustrated in FIG. 3 are identical to those previously described and are designated hereinafter by the same reference characters.

The valve 150 includes a valve body 152 comprising a stop valve body member 154 and a check valve body member 156. The valve body 152 is disposed between the upstream flanged connection member 14 and the downstream flanged connection member 16. The valve body 152 and the flanged connection members 14 and 16 are held in assembled relationship by the threaded fasteners 18 and the threaded nuts 20 and 22 thereon.

The stop valve body 154 includes an upstream end face 158 that is in engagement with the end face 36 on the upstream flanged connection member 14, a downstream end face 160, a bore 162 that extends through the stop valve body member 154 intersecting the end faces 158 and 160. A counterbore 164 extends into the stop valve body member 154 from the end face 158 and an opening 166 extends transversely through the valve body intersecting the counterbore 164. The opening 166 is sized to receive the previously described valve operating member 52.

An annular, axial flange portion 168 formed on the stop valve body member 154 projects from the end face 160 forming a seating surface 170 that generally faces the downstream end of the valve 150 for purposes that will become more apparent hereinafter. As clearly illustrated in FIG. 3, the annular seal member 86 is disposed in the axial flange portion 168 and has the surface 88 thereon arranged to sealingly engage the exterior surface of the previously described valve member 44.

The seat/seal assembly 70, which has also been previously described, is disposed in the counterbore 164 adjacent the end face 158 of the stop valve body member 154. The seat/seal assembly 70 carries the annular seal member 74. The surface 76 thereon is arranged to sealingly engage the exterior surface of the valve member 44.

The check valve body member 156 includes an upstream end face 172 disposed in engagement with the downstream end face 160 on the check valve body member 154, a downstream end face 174 in engagement with the end face 40 on the downstream connection member 16, and a bore 176 extending therethrough and intersecting the end faces 172 and 174. A counterbore 178 extends into the check valve body member 156 from the end face 172 and is sized to receive the axial flange portion 168 on the stop valve body member 154.

An O-ring seal 180 is disposed in the check valve body member 156 adjacent the end face 172 thereon. The O-ring seal 180 is in sealing engagement with the check valve body member 156 and the stop valve body member 154.

The check valve assembly 90 is disposed in the check valve body member 156. The check valve member 92 is pivotally connected with the stop valve body member 156 by the lug portion 98 and the pivot pin 102 as previously described in connection with FIG. 1A. As clearly shown in FIG. 3, the check valve member 92 carries the seal member 96 which is arranged to sealingly engage the seating surface 170 on the axial flange portion 168 of the stop valve body member 154.

As is clearly apparent from viewing FIG. 3, the operation of the valve 150 is precisely the same as previously described in connection with the valve 10 of FIG. 1. By comparing FIGS. 1 and 3, it can be seen that the valve 150 is constructed similarly to the valve 10 but instead of providing a separate seat/seal assembly (such as 77 in FIG. 1) the axial flange portion 168 and the seating surface 170 thereon are part of the stop valve body member 154 and cooperate with the annular seal member 96 to provide the same check valve function as previously described.

Figure 4:
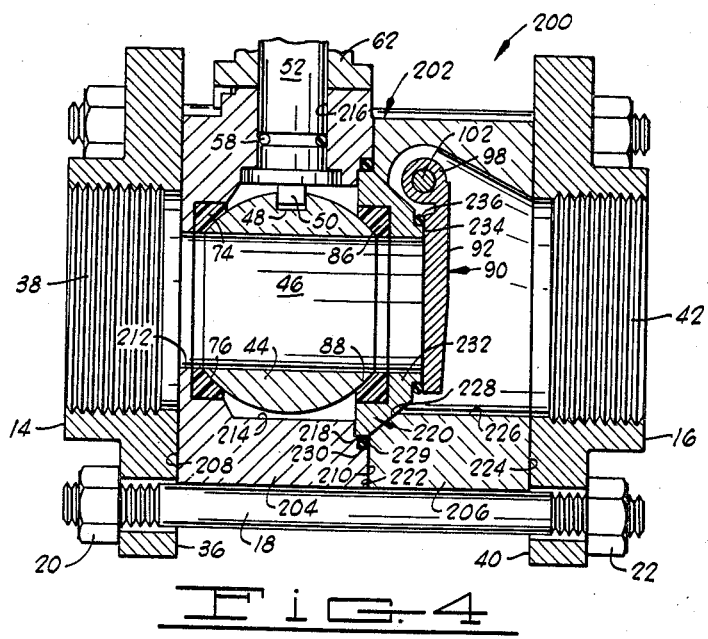
FIG. 4 is a vertical cross-sectional view of a further embodiment of combined stop and check valve that is also constructed in accordance with the invention.

Embodiment of FIG. 4

FIG. 4 illustrates a further embodiment of combined stop and check valve generally designated by the reference character 200 and also constructed in accordance with the invention. As is clearly apparent from viewing FIG. 4, many of the same components previously described are utilized in the valve 200 and are designated therein by the same reference characters previously used.

The valve 200 includes a valve body 202 comprising a stop valve body member 204 and a check a valve body member 206. The valve body 202 is disposed between the upstream flanged connection member 14 and the downstream flanged connection member 16. The valve 200 is held in the assembled relationship as illustrated by the threaded fasteners 18 which extend through the flanged connection members 14 and 16 and by the threaded nuts 20 and 22 that are assembled with the threaded fasteners 18 in engagement with the flanged connection members 14 and 16, respectively.

The stop valve body member 204 includes an upstream end face 208 that is in engagement with the end face 36 on the upstream flanged connection member 14, a downstream end face 210, and a bore 212 extending through the stop valve body member 204 in axial alignment with the opening 38 in the upstream flanged connection member 14 and intersecting the end faces 208 and 210. A counterbore 214 extends into the stop valve body member 204 from the end face 210 thereon.

An opening 216 extends transversely through the stop valve body member 204 intersecting the counterbore 214 for receiving the valve operating member 52 which has been previously described. A relatively shallow counterbore 218 extends into the valve body member 204 from the end face 210 and is arranged to receive an annular seat/seal assembly 220.

The check valve body member 206 includes an end face 222 that is in engagement with the end face 210 on the stop valve body member 204, a downstream end face 224 that is in engagement with the end face 40 on the downstream flanged connection member 16, and a bore 226 that extends therethrough intersecting the end faces 222 and 224. A beveled surface 228 is formed in the check valve body member 206 adjacent the end face 222 to receive the seat/seal assembly 220.

An O-ring seal 229 is disposed in an annular recess 230 formed in the stop valve body member 204 adjacent the end face 210. The O-ring seal 229 is in sealing engagement with the stop valve body member 204, the check valve body member 206 and with the outer periphery of the annular seat/seal assembly 220.

The annular seal member 74 is carried by the stop valve body member 204 relatively near the upstream end face 208 thereon. The annular seal member 74 has the surface 76 thereon arranged to sealingly engage the exterior surface of the previously described stop valve member 44 which is located in the counterbore 214 of the stop valve body member 204.

The seat/seal assembly 220 includes a relatively rigid annular member 232 that has an annular seating surface 234 thereon generally facing the downstream end of the valve 200. The annular member 232 carries the annular seal member 86, which as previously described, has the surface 88 thereon arranged to sealingly engage the exterior surface of the valve member 44.

An O-ring seal 236 encircles the annular seating surface 234 and is carried by the annular member 232. The O-ring seal 236 is arranged to engage the check valve member 92 when the check valve member 92 is in engagement with the annular seating surface 234, closing the flow passageway through the valve 200 as illustrated in FIG. 4.

As previously described, the check valve member 92 forms a portion of the check valve assembly 90 which is pivotally mounted in the check valve body member 206 on the pivot pin 102 as previously described in connection with FIG. 1A.

Operationally, the valve 200 functions as previously described in connection with the embodiment of FIG. 1. The primary distinction between the valve 200 and the previously described valves lies in the provision of the separate stop valve body member 204, check valve body member 206, and the annular seat/seal assembly 220. Manifestly, the valve 200 can be quickly and easily manufactured by well known manufacturing procedures and can be quickly and easily assembled as is readily apparent from viewing FIG. 4.

Figures 5, 6:
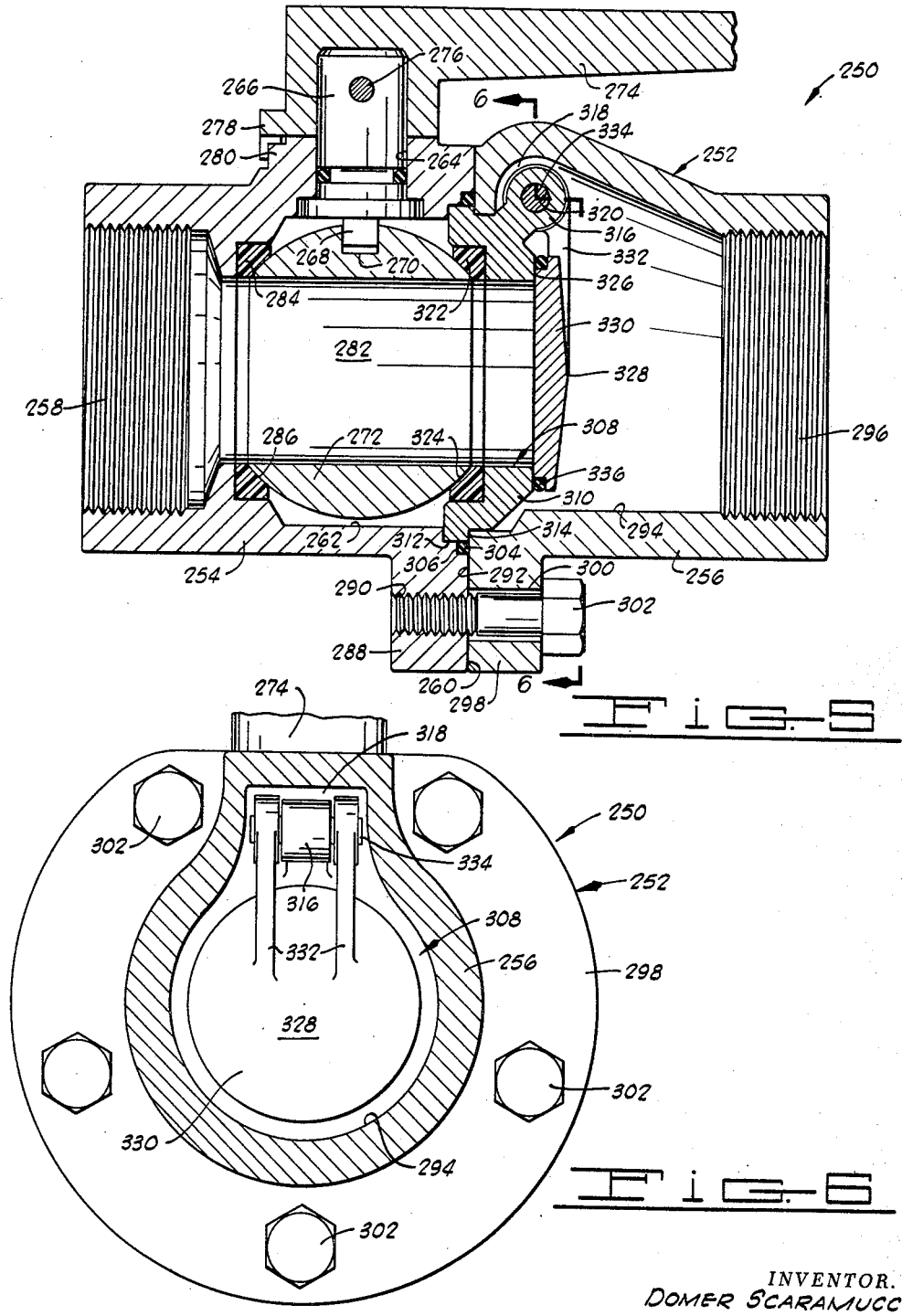
FIG. 5 is a vertical cross-sectional view of one further embodiment of combined stop and check valve that is also constructed in accordance with the invention.
FIG. 6 is a cross-sectional view taken substantially along the line 6—6 of FIG. 5.

Embodiment of FIG. 5

FIG. 5 illustrates still another embodiment of combined stop and check valve generally designated by the reference character 250 and also constructed in accordance with the invention. As shown therein, the valve 250 includes a valve body 252 comprising a stop valve body member 254 and a check valve body member 256.

The stop valve body member 254 has a partially threaded bore 258 extending therethrough intersecting an end face 260 thereon. A counterbore 262 extends into the stop valve body member 254 from the end face 260 and an opening 264 extends transversely through the stop valve body member 254 intersecting the counterbore 262.

The opening 264 is sized to receive a valve operating member 266 that extends therethrough and has a rectangular lower end 268 disposed in a rectangular recess 270 formed in the exterior surface of a stop valve member 272. The valve operating member 266 has its upper or exposed end connected with a valve handle 274 by a pin 276. The handle 274 includes a lug 278 arranged to engage spaced abutments 280 (only one is shown in FIG. 5) to limit the rotation of the handle 274 and the interconnected stop valve member 272 to approximately 90°.

The stop valve member 272, which is illustrated as being spherical in configuration, includes a flow port 282 that extends therethrough and, when in the open position, is axially aligned with the bore 258 in the stop valve body member 254. The stop valve member 272 is rotatable between the open position illustrated at FIG. 5 wherein the flow port 282 is axially aligned with the opening 258 and a closed position wherein the flow port 282 is disposed at substantially 90° relative to the bore 258.

A relatively resilient, annular seal member 284 is carried by the stop valve member 254 relatively near the upstream end of the valve 250. The annular seal member 284 includes a surface 286 that is arranged to sealingly engage the exterior surface of the stop valve member 272.

The stop valve body member 254 also includes an arcuate flange portion 288 extending radially outwardly for purposes that will be described more fully hereinafter. The arcuate flange portion 288 includes a plurality of threaded apertures 290.

The check valve body member 256 includes an end face 292 that is in engagement with the end face 260 on the stop valve body member 254. A bore 294 extends through the check valve body member 256 intersecting the end face 292 at one end and having the opposite end partially threaded as shown at 296.

The stop valve body member 256 also includes an arcuate flange portion 298 (see also FIG. 6) that mates with the arcuate flange portion 288 on the stop valve body member 254. The flange portion 298 is provided with a plurality of apertures 300 arranged to register with the threaded apertures 290 in the stop valve body member 254.

The stop valve body member 254 and the check valve body member 256 are held in assembled relationship by a plurality of threaded fasteners 302. The fasteners 302 extend through the apertures 300 in the flange portion 298 engaging the portion 298 and into threaded engagement with the threaded apertures 290 in the flange portion 288 on the stop valve body member 254.

As shown in FIG. 5, an O-ring seal 304 is disposed in an annular recess 306 formed in the end face 260 of the stop valve body member 254. The O-ring seal 304 sealingly engages the end face 292 of the check valve body member 256, the stop valve body member 254, and the outer periphery of an annular seat/seal assembly 308.

The annular seat/seal assembly 308 includes a relatively rigid annular member 310 that has its outer periphery disposed in a counterbore 312 formed in the stop valve body member 254 adjacent the end face 260 thereon. The annular member 310 includes an annular shoulder 314 that is disposed in engagement with the end face 292 on the check valve body member 254. Thus, it can be seen that the annular seat/seal assembly 308 is securely retained in the valve 250 in the counterbore 312.

The annular member 310 also includes a lug portion 316 that projects radially outwardly therefrom (see also FIG. 6) into a cavity 318 formed in the check valve body member 256. The lug portion 316 has an aperture 320 extending therethrough in a direction generally perpendicular to the bore 294.

The annular member 310 carries a relatively resilient, annular seal member 322 having a surface 324 thereon arranged to sealingly engage the exterior surface of the stop valve member 272. An annular seating surface 326 is formed on the annular member 310 encircling a portion of the bore 294 and generally facing the downstream end of the valve 250.

A check valve member 328 includes a disc-like portion 330 and a pair of spaced lug portions 332 (see also FIG. 6). The spaced lug portions extend upwardly from the disc portion 330 on each side of the lug portion 316 located on the annular member 310. A pivot pin 334 extends through the aperture 320 in the lug portion 316 and through the spaced lug portions 332 on the check valve member 328, pivotally connecting the check valve member 328 with the annular member 310 of the seat/seal assembly 308.

As clearly illustrated in FIG. 5, the disc-like portion 330 of the check valve member 328 is sufficiently large to cover the opening extending through the seat/seal assembly 308 and to engage the annular seating surface 326 thereon. An O-ring seal 336 carried by the disc-like portion 330, is arranged to sealingly engage the seating surface 326 to form a fluid-tight closure therewith.

Operationally, the valve 250 functions precisely as did the previously described combined stop and check valves. Structurally, the valve 250 is different in two important aspects.

As is clearly apparent from viewing FIG. 5, the valve 250 is not disposed between flanged connection members as were the previously described embodiments, but is held in assembled relationship by the threaded fasteners 302 which extend through and engage the mating arcuate flange portions 288 and 298 on the stop valve body member 254 and the check valve body member 256, respectively. Also, it is important to note that the seat/seal assembly 308 not only provides for the seating and sealing of the stop valve member 272 and the seating and sealing of the check valve member 328, but also pivotally supports the check valve member 328.

As is readily apparent from viewing FIG. 5, the stop valve body member 254 and the check valve body member 256 may be quickly and easily manufactured by well-known manufacturing procedures. The seat/seal assembly 308, that is, the relatively rigid annular member 310 forming a part thereof can be easily cast so that the entire valve 250 may be easily and economically manufactured.

From the foregoing detailed descriptions of the various embodiments of combined stop and check valve, it will be apparent that the structural arrangements set forth are relatively light-weight, very compact, and avoid the additional expense of assembly time that is usually required when two separate valves are utilized. Manifestly, the embodiments described each efficiently perform the desired functions of either the stop valve or the check valve or of both valves in combination as required in the fluid circuit. It can also be appreciated that the various components forming the described valves, which are subject to wear during their service life, may be quickly and easily removed, repaired and/or replaced.

What I claim is:

1. A combined stop and check valve comprising:
   a valve body including:
      a stop valve body member having upstream and downstream end faces and having a bore extending therethrough intersecting said end faces, and
      a check valve body member having an upstream end face in engagement with the downstream end face on said stop valve body member, a downstream end face, and a bore extending therethrough in axial alignment with the bore extending through the stop valve body member;
   a stop valve member disposed in the bore in the stop valve body member, said stop valve member having a port extending therethrough and being rotatable between an open position wherein said port is aligned with said bore and a closed position wherein said port and bore are disaligned;
   a relatively rigid annular member encircling a portion of one of said bores between said stop valve member and the downstream end of said check valve body member and having an annular surface thereon extending normal to the center line of said bores and facing the downstream end of said check valve body member;
   an annular seat/seal member carried by said first annular member and arranged to sealingly engage said stop valve member when said stop valve member is in the closed position;
   a check valve member disposed in the bore in the check valve body member between said annular member and the downstream end of said check valve body member and including a disc-like body portion sized to engage said annular surface to close said bore and a lug portion projecting from the periphery of said body portion and pivotally supported in said valve body, said check valve member being pivotal away from said annular surface in response to fluid flow through said bore from the upstream end to the downstream end of said check valve body member to a position out of the flow path of fluid flowing through said stop valve member and being pivotal into engagement with said surface to close said bore to prevent fluid flow through said bore in the opposite direction; and
   connection means holding said valve assembled with the downstream end face on said stop valve body member in engagement with the upstream end face on said check valve body member.

2. A combined stop and check valve comprising:
   a valve body including
      a stop valve body member having upstream and downstream end faces and having a bore extending therethrough intersecting said end faces, and
      a check valve body member having an upstream seal face in engagement with the downstream end face on said stop valve body member, a downstream end face, a bore extending therethrough in axial alignment with the bore extending through said stop valve body member, and an annular seating surface thereon encircling a portion of said bore and extending normal to the center line of said bore and facing the downstream end of said check valve body member;

an annular seat/seal member disposed in said check valve body member encircling a portion of said bore adjacent the upstream end thereof;

a stop valve member disposed in the bore in said stop valve body member, said stop valve member having a port extending therethrough and being rotatable between an open position wherein said port is aligned with said bore and a closed position wherein said port and bore are disaligned, said stop valve member sealingly engaging said seat/seal member when in the closed position;

a check valve member disposed in the bore in said check valve body member between said annular seating surface and the dowstream end of said check valve body member and including a disc-like body portion and a lug portion projecting from the periphery of said body portion and pivotally connected with said check valve body member, said check valve member being pivotal in said bore away from said annular seating surface in response to fluid flow through said bore from the upstream end to the downstream end of said check valve body member to a position out of the flow path of fluid flowing through said stop valve member, and said check valve member being movable into sealing engagement with said annular seating surface to prevent fluid flow through said bore in the opposite direction; and connection means holding said valve assembled with the downstream end face on said stop valve body member in engagement with the upstream end face on said check valve body member.

3. The combined valve of claim 2 wherein said connection means includes:

a first flanged connection member having an end face in engagement with the upstream end face on said stop valve body member and having an opening extending therethrough intersecting said end face and in axial alignment with the bore in said stop valve body member;

a second flanged connection member having an end face in engagement with the downstream end face on said check valve body member and having a bore extending therethrough intersecting said end face and in axial alignment with the bore extending through said valve; and, a plurality of threaded fasteners extending between and engaging said flanged connection members to hold said valve assembled.

4. A combined stop and check valve comprising:

a valve body including a stop valve body member having upstream and downstream end faces, a bore extending therethrough intersecting said end faces, and an axial flange portion projecting from said downstream end face, said axial flange portion having an annular seating surface thereon encircling a portion of said bore and lying in a plane generally parallel to the plane of said downstream end face, and a check valve body member having an upstream end face in engagement with the downstream end face on said stop valve body member, a downstream end face, a bore extending therethrough in axial alignment with the bore extending through the stop valve body member;

an annular seat/seal member disposed in said stop valve body member encircling a portion of said bore adjacent the downstream end thereof;

a stop valve member disposed in the bore in said stop valve body member, said stop valve member having a port extending therethrough and being rotatable between an open position wherein said port is aligned with said bore and a closed position wherein said port and bore are disaligned, said stop valve member sealingly engaging said seat/seal member when in the closed position;

a check valve member disposed in the bore in said check valve body member between said annular seating surface and the downstream end of said check valve body member and including a disc-like body portion and a lug portion projecting from the periphery of said body portion and pivotally connected with said check valve body member, said check valve member being pivotal in said bore away from said annular seating surface in response to fluid flow through said bore from the upstream end to the downstream end of said valve to a position out of the flow path of fluid flowing through said stop valve member, said check valve member being movable into sealing engagement with said annular seating surface to prevent fluid flow through said bore in an opposite direction; and, connection means holding said valve assembled with the downstream end face on said stop valve body member in engagement with the upstream end face on said check valve body member.

5. The combined valve of claim 4 and also including a resilient annular seal member carried by said disc-like body portion of said check valve member, said annular seal member being engageable with said seating surface when said check valve member is in the closed position.

6. A combined stop valve comprising:

a valve body including a stop valve body member having upstream and downstream end faces and having a bore extending therethrough intersecting said end faces, and a check valve body member having an upstream end face in engagement with the downstream end face on said stop valve body member, a downstream end face, and a bore extending therethorugh in axial alignment with the bore extending through the stop valve body member;

a relatively rigid first annular member encircling a portion of said bore in engagement with said stop valve body member and said check valve body member and having an annular seating surface thereon extending normal to the center line of said bores generally facing the downstream end of said check valve body member;

an annular seat/seal member carried by said annular member encircling a portion of said bore adjacent the downstream end of said stop valve body member;

a stop valve member disposed in the bore in said stop valve body member, said stop valve member having a port extending therethrough and being rotatable between an open position wherein said port is aligned with said bore and a closed position wherein said port and bore are disaligned, said stop valve member sealing engaging said seat/seal member when in the closed position;

a check valve member disposed in the bore in said check valve body member between said annular seating surface and the downstream end of said check valve body member and including a disc-like body portion and a lug portion projecting from the periphery of said body portion and pivotally connected with said check valve body member, said check valve body member being pivotal in said bore away from said annular seating surface in response to fluid flow through said bore from the upstream end to the downstream end of said check valve body member to a position out of the flow path of fluid flowing through said stop valve member and movable into sealing engagement with said annular seating surface to prevent fluid flow through said bore in the opposite direction; and, connection means holding said valve assembled with the downstream end face on said stop valve body member in engagement with the upstream end face on said check valve body member.

7. The combined valve of claim 6 and also including a resilient annular seal member sealing engaging said annular member, the downstream end face of said stop valve body member, and the upstream end face on said check valve body member.

8. A combined stop and check valve comprising:
a valve body including
   a stop valve body member having upstream and downstream end faces and having a bore extending therethrough intersecting said end faces, and
   a check valve body member having an upstream end face in engagement with the downstream end face on said stop valve body member, a downstream end face, and a bore extending therethrough in axial alignment with the bore extending through the stop valve body member;
annular seat/seal means disposed in said valve and encircling a portion of the bores in said stop valve body member and check valve body member, said seat/seal means including
   a relatively rigid annular member having an outer peripheral portion engaging said stop valve body member and said check valve body member, an annular seating surface thereon extending normal to the center line of said bores and facing the downstream end of said check valve body member, and a lug portion projecting therefrom and having an aperture extending therethrough generally perpendicularly to the bore extending through said body members, and
   an annular seat/seal member disposed in said annular member and encircling a portion of said bore adjacent said stop valve body member;
a stop valve member disposed in the bore in said stop valve body member, said stop valve member having a port extending therethrough and being rotatable between an open position wherein said port is aligned with said bore and a closed position wherein said port and bore are disaligned, said stop valve member sealingly engaging said seat/seal member when in the closed position;
a check valve member disposed in the bore in said check valve body member between said annular seating surface and the downstream end face of said check valve body member and including a disc-like body portion and a lug portion projecting from the periphery of said body portion and pivotally connected with the lug portion on said annular member, said check valve member being pivotal in said bore away from said annular seating surface in response to fluid flow through said bore from the upstream end to the dowstream end of said check valve body member to a position out of the flow path of fluid flowing through said stop valve member, and said check valve member being movable into sealing engagement with said annular seating surface to prevent fluid flow through said bore in the opposite direction; and, connection means holding said valve assembled with the downstream end face on said stop valve body member in engagement with the upstream end face on said check valve body member.

9. The combined valve of claim 8 wherein said connection means includes:
an arcuate flange portion adjacent the downstream end of said stop valve body member;
an arcuate flange portion on said check valve body member adjacent the upstream end thereof engaging the arcuate flange portion on said stop valve body member; and,
a plurality of threaded fasteners extending between and engaging said arcuate flange portions to hold said valve assembled.

10. The combined valve of claim 8 and also including an annular seal member in sealing engagement with the outer periphery of said annular member, with said stop valve body member, and with said check valve body member.

11. The combined valve of claim 8 and also including:
a second annular seat/seal means encircling a portion of the bore extending through said stop valve body member disposed adjacent the upstream end thereof and arranged to sealingly engage said stop valve member; and,
an annular seal member arranged to form a fluid tight seal between said annular member and said check valve member when said check valve member is disposed in engagement with said annular seating surface.

References Cited

UNITED STATES PATENTS

| | | | |
|---|---|---|---|
| 613,600 | 11/1898 | Plant | 137—614.2 |
| 3,053,278 | 10/1962 | Verheul | 137—614.21 |
| 3,182,952 | 5/1965 | Montesi | 251—148 |

FOREIGN PATENTS

| | | |
|---|---|---|
| 1,310,066 | 11/1962 | France. |
| 1,376,015 | 10/1964 | France. |

WILLIAM F. O'DEA, Primary Examiner

H. M. COHN, Assistant Examiner

U.S. Cl. X.R.

251—315